Jan. 24, 1928.
A. B. DRURY
1,657,302
WHEEL CONSTRUCTION
Filed Sept. 20, 1926
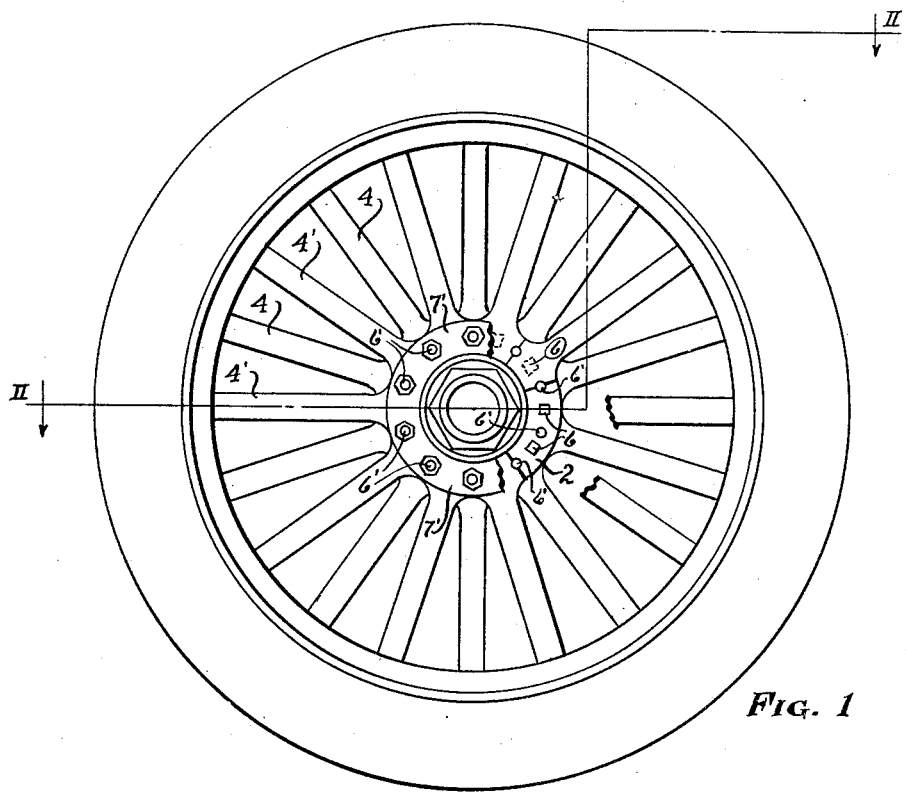
FIG. 1
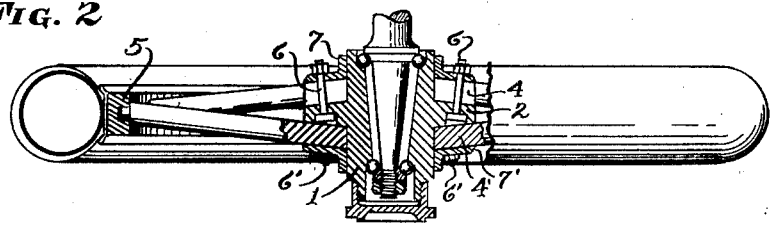
FIG. 2
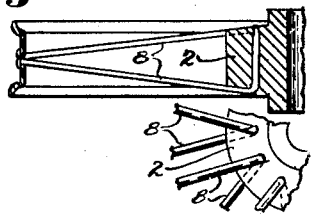
FIG. 3
FIG. 4
INVENTOR.
Archie B. Drury
BY
ATTORNEY.

Patented Jan. 24, 1928.

1,657,302

UNITED STATES PATENT OFFICE.

ARCHIE B. DRURY, OF KIOWA, KANSAS.

WHEEL CONSTRUCTION.

Application filed September 20, 1926. Serial No. 136,595.

The objects of my invention are as follows;

First—to produce a wheel having a simple construction and high efficiency in strength value.

Second—ease with which the spokes may be assembled or replaced.

Third—the possibility of replacing the spokes without demounting the wheel from the vehicle.

Referring to the drawings;

Fig. 1 is a side elevation of the wheel, parts removed for convenience of illustration.

Fig. 2 is a sectional view taken along the lines II, II, in Fig. 1.

Fig. 3 is a sectional view of a wire spoke construction taken along a line similar to line II, II in Fig. 1.

Fig. 4 is a fragmentary side view of Fig. 3.

The hub 1 has an annular flange 2 centrally positioned and integral therewith, the sides tapering outwardly so that the spokes 4 and 4' will converge and contact the felloe 5 of the wheel in central alignment. After the spokes are positioned around the hub 1 and in the felloe 5 ring plates 7 and 7' are slipped over the hub and against the spokes 4 and 4'. Bolts 6 and 6', the heads of which are counter sunk in the flange 2, project outward and pass through holes in the ring plates 7 and 7', this construction making it possible to remove and replace either plate independent of the other while the wheel is in operative position on the vehicle, either set of spokes being capable of carrying the load independent of the other.

In Figs. 3 and 4 is shown a wire spoke construction in which the flange 2 is of greater width than that used for the wood spokes, the object of which being to dish the spokes in opposite direction, the ends thereof intersecting and rigidly attached to the center of the felloe; note that the spokes are tangentially positioned to the axis of the wheel and are imbedded in grooves placed in the sides of the flange, radially extending from the aperture in which they engage.

The two types of wheels herein disclosed have staggered spokes and are positioned alike relative to the hub and felloe connection, and the spokes being dished in opposite directions is bracing means for the side thrust of the wheel. This construction may be applied to other makes of wheel, such as commonly used on wagons, tractors, farming machinery and the like.

Such modifications may be employed as lie within the scope of the appended claims. What I claim as new and desire to secure by Letters Patent is:

1. In a wheel construction, a flange centrally positioned on a hub, the sides thereof tapering outwardly, a set of spokes placed on each side of the flange, each set of spokes being bolted to the flange independently of the other, the outer ends of said spokes connected to the felloe in alignment, all substantially as shown.

2. In a wheel construction, a hub having an annular flange centrally positioned thereon and integral therewith, tapering sides for the flange, the said flange having a plurality of apertures each being countersunk on opposite sides of the flange alternately to receive bolts extending in opposite directions, a set of spokes rigidly and removably attached to each side of the flange, a ring to engage on each end of the hub as binding means for the spokes, apertures in the rings in registry with their respective apertures in the flange, bolts engaging in the apertures of the flange and the rings as means for binding said rings firmly to the flanged member, the said rings and adjacent spokes being removable independently of each other.

3. In a wheel construction, a wheel having a hub with an annular flange converging outwardly and adapted to support a plurality of spokes on each side thereof so that the outer ends of the spokes will connect to the felloe in alignment, a ring adapted to engage over each end of the hub and means for attaching the rings to the flange binding the spokes firmly therebetween, the rings and their respective spokes removable independently of each other.

4. In a wheel construction, a hub having a flange centrally positioned thereon, the sides of the flange slanting toward each other so that the apex thereof will intersect at the center of the felloe of the wheel, said flange functioning as a separator for the inner ends of spokes and attaching means therefor, spokes to engage with the hub and the outer ends to the felloe.

ARCHIE B. DRURY.